(12) United States Patent
Vaikar

(10) Patent No.: US 10,481,897 B2
(45) Date of Patent: Nov. 19, 2019

(54) SYSTEM AND METHOD FOR RESILIENT SOFTWARE UPGRADES IN A VIRTUAL DATACENTER

(71) Applicant: VMWARE, INC., Palo Alto, CA (US)

(72) Inventor: Amol Manohar Vaikar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 86 days.

(21) Appl. No.: 15/791,434

(22) Filed: Oct. 24, 2017

(65) Prior Publication Data

US 2019/0012162 A1 Jan. 10, 2019

(30) Foreign Application Priority Data

Jul. 4, 2017 (IN) .............................. 201741023460

(51) Int. Cl.
*G06F 8/65* (2018.01)
*G06F 9/455* (2018.01)
*G06F 11/14* (2006.01)

(52) U.S. Cl.
CPC ................ *G06F 8/65* (2013.01); *G06F 9/455* (2013.01); *G06F 9/45533* (2013.01); *G06F 9/45558* (2013.01); *G06F 11/1433* (2013.01); *G06F 2009/45595* (2013.01)

(58) Field of Classification Search
CPC .... G06F 8/65; G06F 9/45533; G06F 9/45558; G06F 2009/45595; G06F 9/455; G06F 11/1433

USPC ....................................... 717/168–173; 718/1
See application file for complete search history.

(56) References Cited

U.S. PATENT DOCUMENTS

| 2014/0281030 | A1* | 9/2014 | Cui | H04L 43/026 709/244 |
|---|---|---|---|---|
| 2015/0089331 | A1* | 3/2015 | Skerry | G06F 9/45533 714/799 |
| 2016/0112442 | A1* | 4/2016 | Sourek | H04L 63/1416 726/23 |
| 2016/0321455 | A1* | 11/2016 | Deng | G06F 21/577 |
| 2016/0359912 | A1* | 12/2016 | Gupta | H04L 63/1425 |
| 2017/0093922 | A1* | 3/2017 | Duan | H04L 63/1408 |

* cited by examiner

*Primary Examiner* — Qing Chen

(57) ABSTRACT

In one example, resilient software application upgrades in a virtual datacenter is disclosed, in which network flow data is periodically obtained between a plurality of APPVMs and/or containers and deep packet inspection information from firewalls associated with the obtained network flow data in the virtual datacenter. Dependency relationships between the plurality of APPVMs and/or containers are then obtained based on the periodically obtained network flow data, the periodically obtained deep packet inspection information, and a network flow criteria. An upgrade that is about to happen to a software residing in one or more of the plurality of APPVMs and/or containers is determined. One or more of the plurality of APPVMs and/or containers affected by the software upgrade is determined based on the determined dependency relationships. Snapshots of the affected one or more of the plurality of APPVMs and/or containers are then obtained before initiating the software upgrade.

20 Claims, 4 Drawing Sheets

SYSTEM AND METHOD FOR RESILIENT SOFTWARE UPGRADES IN A VIRTUAL DATACENTER

RELATED APPLICATIONS

Benefit is claimed under 35 U.S.C. 119(a)-(d) to Foreign Application Serial No. 201741023460 filed in India entitled "SYSTEM AND METHOD FOR RESILIENT SOFTWARE UPGRADES IN A VIRTUAL DATACENTER", on Jul. 4, 2017, by VMware, Inc., which is herein incorporated in its entirety by reference for all purposes.

BACKGROUND

Modern enterprise/consumer grade applications (distributed applications) may be hosted in several servers (for example, virtual machines (VMs) and/or containers), such as web servers, user interface (UI) servers, business logic servers, database servers, file servers and so on. For example, some of the servers could be hosting databases, some could be hosting web servers, and while others could be hosting various components of a business logic. Generally, these are distinct servers dedicated to performing specific tasks and may not be amicable to software upgrades to be performed in one operation. Such servers may need to be upgraded on a stage-by-stage basis, i.e., server by server basis.

In the above scenario, upgrading software applications with a new version can involve two ways, one being pushing binaries and the other being changing the configuration on the systems and/or migrating/affecting data in some manner so that the data can be used by the upgraded software applications. Generally, pushing the binaries can be safe as upgraded software application can be undone, old binaries can be recovered and also may not corrupt the data. However, sometimes, the binaries may have a software bug that may corrupt the data stored by the software application in various databases, files and stores. Further, the upgraded software application may have a bug and changing the configuration and/or migrating the data may lead to data corruption, which can be risky during operation and may not be recoverable. Furthermore, in such a scenario, an upgrade failure in any one of the servers may result in downgrading other servers that have been already successfully upgraded, because the software application can be brought online while the failed upgrade is debugged and resolved. This may result in bringing a new server to the "old" state of the failed server so that an upgrade can be re-attempted and the process may have to be repeated until the upgrade is successful.

Existing solutions require taking manual snapshots of the APPVMs and containers where the application is being upgraded. This may require the IT administrator to determine all the APPVMs and/or containers that are likely to be impacted during the upgrade. Further, depending on the virtualization solution being used, appropriate command-line interfaces (CLIs)/application program interfaces (APIs) may be called on the hypervisor to trigger a snapshot. Such a manual process can be prone to errors, for example, the IT administrator may miss taking a snapshot of an impacted APPVM and/or container due to any missed or unknown dependencies as there can be several hundred or thousand APPVMs and/or containers in a virtual datacenter. Furthermore, the IT administrator may need to write complex logic to determine APPVM and/or container dependencies. In addition, the IT administrator may need to write code to take the needed snapshots for upgrading. Moreover, the written code can have bugs that may result in errors in dependencies and snapshots. In addition, the IT administrator may need the knowledge of the hypervisor and also be familiar of the snapshotting mechanism to write the code for taking all the needed snapshots.

DETAILED DESCRIPTION

Figure 1:
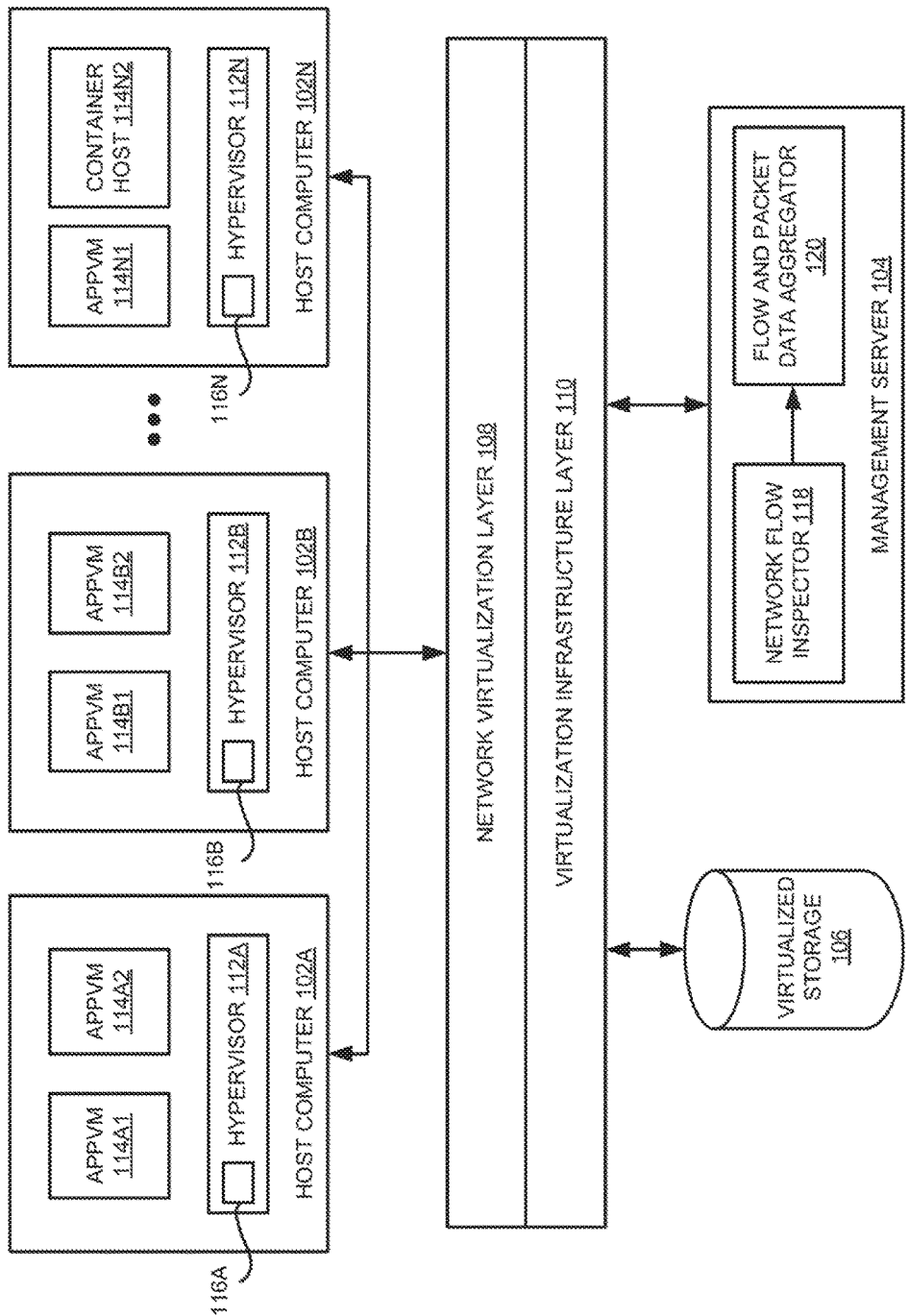
FIG. 1 is an example block diagram illustrating system for providing resilient software upgrades in a virtual datacenter, according to the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by an APPVM that includes a container virtualization layer (e.g., Docker). A VM refers generally to an isolated end user space instance, which can be executed within a virtualized environment. Other technologies aside from hardware virtualization can provide isolated end user space instances and may also be referred to as VCIs. The term "VCI" covers these examples and combinations of several types of VCIs, among others.

VMs, in some embodiments, operate with their own guest operating systems on a host using resources of the host virtualized by virtualization software (e.g., a hypervisor, virtual machine monitor, and the like). The tenant (i.e., the owner of the APPVM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the APPVM segregation that may be offered in hypervisor-virtualized environments to virtualize system hardware, and thus can be viewed as a form of virtualization to isolate diverse groups of applications that operate in different containers. Such containers may be more lightweight than APPVMs.

Multiple VCIs can be configured to be in communication with each other in a software defined datacenter. In such a system, information can be propagated from an end user to at least one of the VCIs in the system, between VCIs in the system, and/or between at least one of the VCIs in the system and a non-virtualized physical host.

The present disclosure is not limited to particular devices or methods, which may vary. The terminology used herein is for describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The terms "network flow", "packet flow", "data flow", and "traffic flow" are being used interchangeably throughout the document. Also, the terms "software", "software application", "distributed application" are being used interchangeably throughout the document.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated to provide several additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to providing resilient software upgrades, for example, in the context of a software defined datacenter (e.g., a distributed computing environment) including one or more VCIs and/or hosts. In some embodiments, an example machine-readable medium may store instructions executable by a processing resource to provide resilient software upgrades in a virtual datacenter.

FIG. 1 is an example block diagram of a system 100 including upgrade helpers 116A-N residing in associated hypervisors 112A-N for providing resilient software upgrades in a virtualized computing infrastructure of a virtual datacenter. As shown in FIG. 1, the system 100 includes the host computers 102A-N that are communicatively coupled to a virtualization infrastructure layer 110 via a network virtualization layer 108. Further as shown in FIG. 1, the host computers 102A-N have hypervisors running application VMs (APPVMs) and/or container hosts 114A1-N1 and 114A2-N2. The APPVMs 114A1-N1 and 114A2-N2 refer to VMs hosting distributed applications in the virtual datacenter. The network virtualization layer 108 may be a software defined networking virtualization platform. The network virtualization layer 108 may provide network virtualization to the hypervisors 112A-N. Also, the network virtualization layer 108 may provide virtual firewall services. The network virtualization layer 108 may be configured to view all the network data flow activity between APPVMs/container host and the firewall components and may further perform deep packet inspection to determine purpose of communications, such as database request, storage area network (SAN) request, hypertext transfer protocol (HTTP) request and the like. The virtualization infrastructure layer 110 may control the hypervisors 112A-N, software defined networks (SDN) components as well as a virtualized storage 106 to maintain metadata to enable centralized administration.

Furthermore as shown in FIG. 1, the virtualized storage 106 and management server 104 are communicatively coupled to the host computers 102A-N via the virtualization infrastructure layer 110 and the network virtualization layer 108. Also as shown in FIG. 1, the management server 104 includes a network flow inspector 118 and a flow and packet data aggregator 120.

Figure 2:
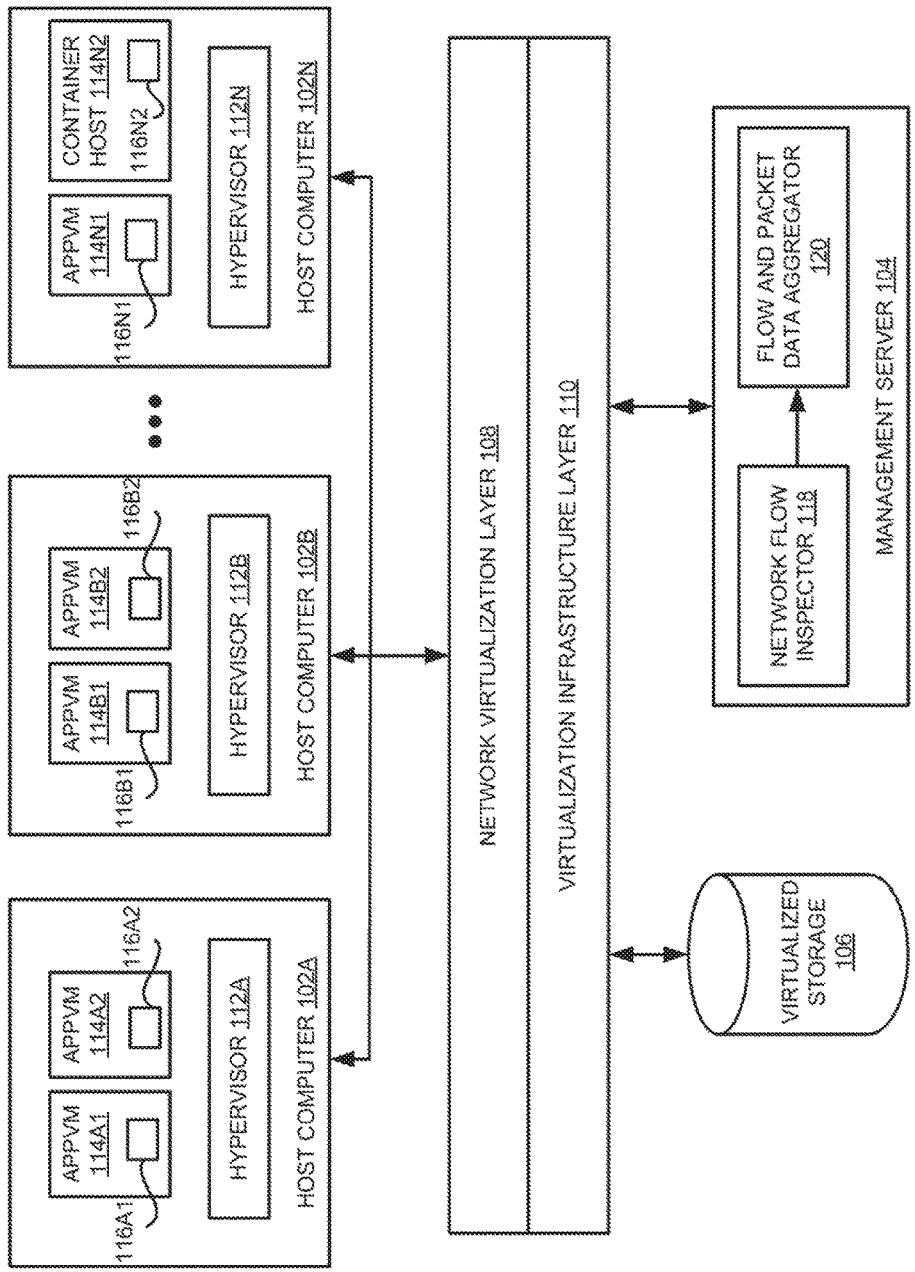
FIG. 2 is another example block diagram illustrating system for providing resilient software upgrades in a virtual datacenter, according to the present disclosure.

FIG. 2 is a diagram of a system 200 that is similar to FIG. 1, except that the upgrade helpers 116A1-N1 and 116A2-N2 reside in respective APPVMs and container host 114A1-N1 and 114A2-N2.

In operation, the network flow inspector 118 periodically obtains network flow data between a plurality of APPVMs and/or containers in a virtual datacenter, such as the ones shown in FIGS. 1 and 2. Further in operation, the network flow inspector 118 periodically obtains deep packet inspection information from firewalls associated with the obtained network flow data in the virtual datacenter, such as the ones shown in FIGS. 1 and 2. In some embodiments, the network flow inspector 118 may periodically collect the network flow/traffic information from the SDN layer, such as the network virtualization layer 108 and/or the virtualization infrastructure layer 110. Example network flow/traffic information may include network flow data, deep packet inspection information and the like. Example deep packet inspection information may include response time between network and application (i.e., APPVMs and container host 114A1-N1 and 114A2-N2), purpose of communication request, application traffic volume details, and/or user conversation details. Example purpose of communication request may include database request, SAN request, and/or HTTP request. In some embodiments, the network flow inspector 118 may maintain historical information of the periodically obtained network flow data and the deep packet inspection information for a predetermined time interval.

The flow and packet data aggregator 120 then determines dependency relationships between the plurality of APPVMs and/or containers based on the periodically obtained network flow data, the periodically obtained deep packet inspection information, and a network flow criteria. For example, the network flow criteria may include volume of network flow between the plurality of APPVMs and/or containers, frequency of the network flow between the plurality of APPVMs and/or containers, duration of the network flow between the plurality of APPVMs and/or containers, and nature of the network flow between the plurality of APPVMs and/or containers and the like. In some embodiments, the flow and packet data aggregator 120 determines association of any one or more of the plurality of APPVMs based on the periodically obtained network flow data and/or deep packet inspection information. In some embodiments, the flow and packet data aggregator 120 creates one or more topology graphs between the distributed applications (i.e., software residing in the plurality of APPVMs) and the plurality of APPVMs and/or containers based on the network flow criteria. Further in these embodiments, the flow and packet data aggregator 120 determines association and/or potential dependencies of any one or more of the plurality of APPVMs based on the created topology graphs. Further in these embodiments, the flow and packet data aggregator 120 may periodically update the created topology graphs based on the periodically obtained network flow data and the deep packet inspection information.

The upgrade helpers 116A-N (or 116A1-N1 and 116A2-N2), either residing in the hypervisors 112A-N, as shown in FIG. 1, or in the APPVMs and/or in the container host operating system (OS) 114A1-N1 and 114A2-N2, as shown in FIG. 2, then determine whether an upgrade is about to happen to the software residing in the one or more of the plurality of APPVMs and/or containers 114A1-N1 and 114A2-N2. In some embodiments, the upgrade helpers 116A-N may monitor and determine any changes happening to any of the critical components of the APPVMs operating system. For example, the critical components may include operating system registry on Windows®, and paths like/etc/opt on Linux/Unix® and the like. In other embodiments, the upgrade helpers 116A-N may include CLI/API to trigger to indicate that an upgrade to the software is about to take place and/or is underway. In these embodiments, the trigger may be initiated based on whether the upgrade is associated with the critical components. In some embodiments, the upgrade helpers 116A-N may communicate that the upgrade is about to happen to the flow and packet data aggregator 120 to determine which of APPVMs are affected and/or associated with the upgrade. Further, the CPI/API may spawn a service that can monitor any changes that are being made to critical OS components like the windows registry. For example, the upgrade helpers 116A-N may monitor any changes taking place to Windows® registry by using APIs, like RegNotifyChangeKeyValue( ). APIs may also be configured to watch changes to file system on Windows® as well as Linux/Unix®. In some embodiments, a file system filter driver (for example, Windows®), a user or kernel space file system driver can be written to monitor changes to critical parts of the OS and/or the software application to determine any changes that are being made to the software that may indicate an upgrade is about to happen.

The upgrade helpers 116A-N then determine one or more of the plurality of APPVMs and/or containers that are affected by the software upgrade based on the determined dependency relationships. The upgrade helpers 116A-N then obtain snapshots of the affected one or more of the plurality of APPVMs and/or containers before initiating the software upgrade of the one or more of the plurality of APPVMs. The upgrade helpers 116A-N may communicate to the virtualization infrastructure layer 110 via the CLI/API that the upgrade is about to happen and to take the snapshots of the affected/related one or more of the plurality of APPVMs. In case the software upgrade fails and/or results in any data corruption after the software upgrade, the plurality of affected/related APPVMs may be restored using the taken snapshots to undo any of the effects of the failed upgrade.

Figure 3:
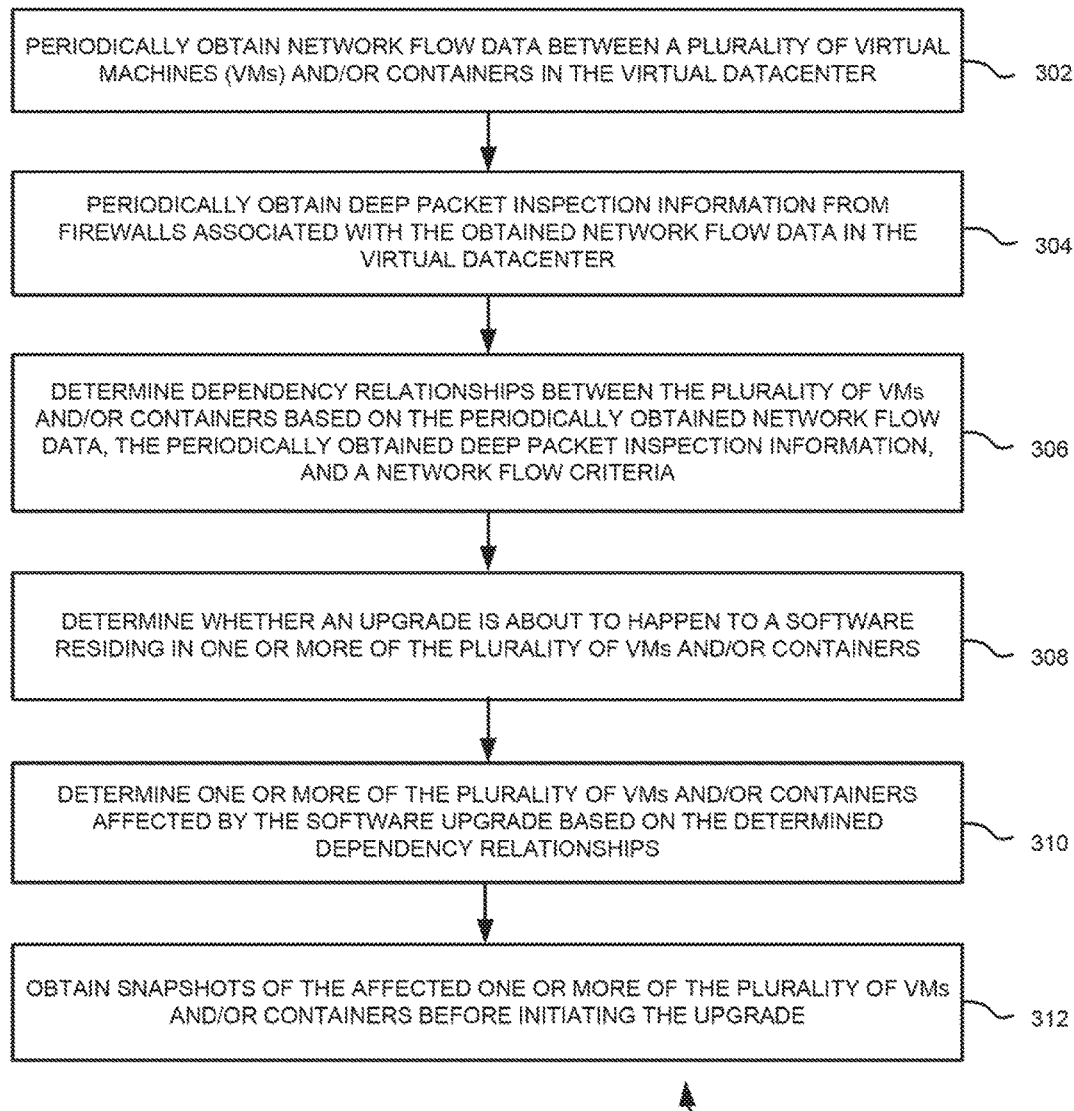
FIG. 3 is a flow diagram of a method for providing resilient software upgrades in a virtual datacenter, according to the present disclosure.

With reference now to FIG. 3, a flowchart of a method 300 for resilient software upgrades is shown in accordance with an embodiment. At 302, network flow data is periodically obtained between a plurality of APPVMs and/or containers in a virtual datacenter. At 304, deep packet inspection information is periodically obtained from firewalls associated with the obtained network flow data in the virtual datacenter. At 306, dependency relationships are determined between the plurality of APPVMs and/or containers based on the periodically obtained network flow data, the periodically obtained deep packet inspection information, and a network flow criteria. At 308, the method 300 determines whether an upgrade, is about to happen, to a software, residing in one or more of the plurality of APPVMs and/or containers. At 310, the method 300 determines one or more of the plurality of APPVMs and/or containers affected by the software upgrade based on the determined dependency relationships. At 312, snapshots of the affected one or more of the plurality of APPVMs and/or containers are obtained before initiating the software upgrade.

The method 300 for providing a resilient software upgrade is explained in more detail with reference to the block diagrams 100 and 200 shown in FIGS. 1 and 2, respectively.

Figure 4:
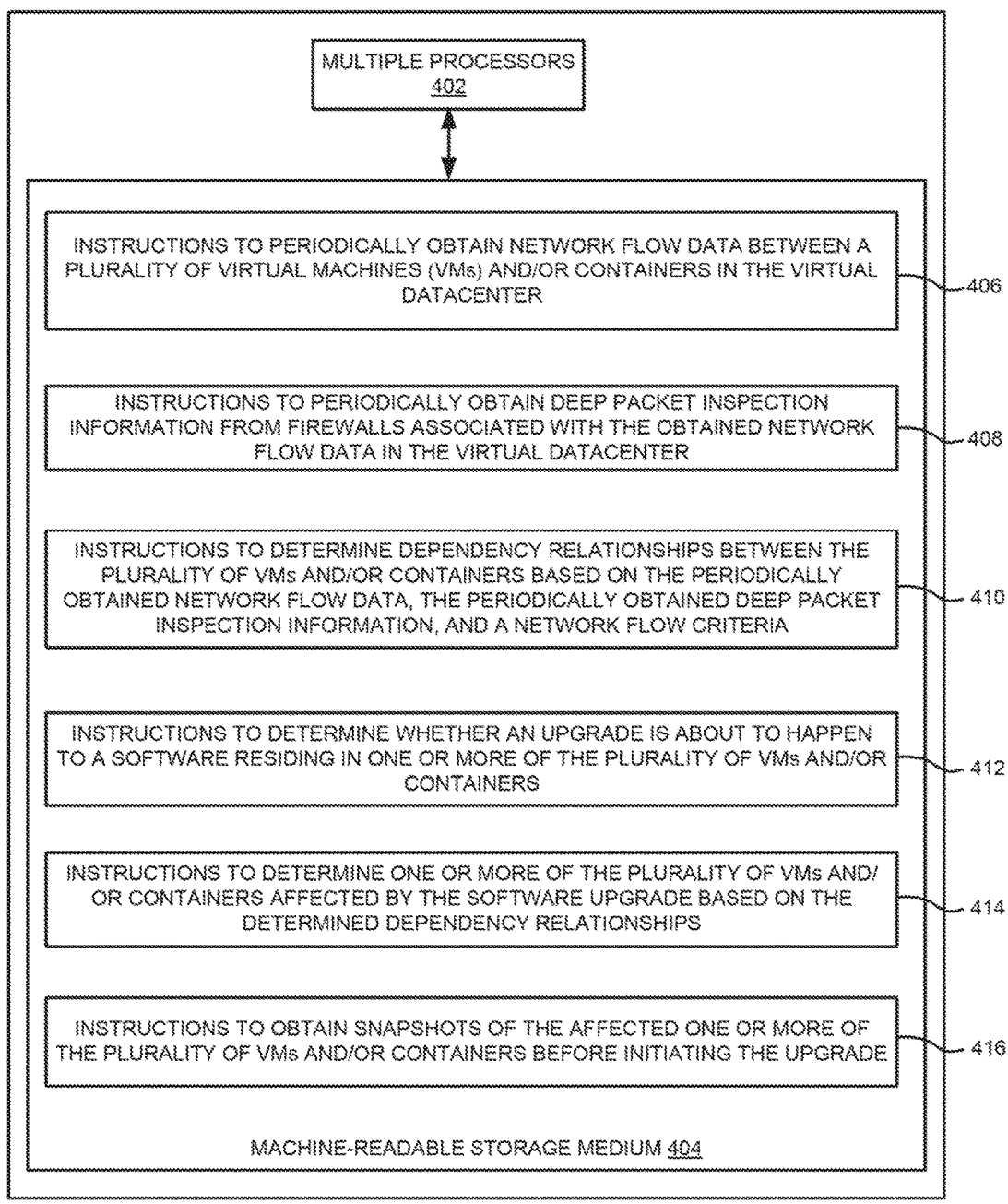
FIG. 4 is a diagram of a non-transitory machine readable medium storing instructions for resilient software upgrades, according to the present disclosure.

FIG. 4 is a block diagram of an example system 400 including instructions in a machine-readable storage medium for providing resilient software upgrades in virtual datacenter. System 400 includes a processor 402 and a machine-readable storage medium 404 communicatively coupled through a system bus. In an example, the processor 402 may be any type of Central Processing Unit (CPU), microprocessor, or processing logic that interprets and executes machine-readable instructions stored in the machine-readable storage medium 404. The machine-readable storage medium 404 may be a random-access memory (RAM) or another type of dynamic storage device that may store information and machine-readable instructions that may be executed by the processor 402. For example, the machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, the machine-readable storage medium may be a non-transitory machine-readable medium.

The machine-readable storage medium 404 may store instructions 406, 408, 410, 412, 414 and 416. In an example, instructions 406 may be executed by the processor 402 to periodically obtain network flow data between a plurality of APPVMs and/or containers in a virtual datacenter. Instructions 408 may be executed by the processor 402 to periodically obtain deep packet inspection information from firewalls associated with the obtained network flow data in the virtual datacenter. In an example, the instructions to periodically obtain network flow data and deep packet inspection information may comprise periodically obtaining network flow data and deep packet inspection information within a SDN platform and a virtualization infrastructure layer. Instructions 410 may be executed by the processor 402 to determine dependency relationships between the plurality of APPVMs and/or containers based on the periodically obtained network flow data, the periodically obtained deep packet inspection information, and a network flow criteria. In an example, the instruction to determine the dependency relationships between the plurality of APPVMs and/or containers may comprise creating one or more topology graphs between the distributed applications (i.e., software residing in the plurality of APPVMs) and the plurality of APPVMs and/or containers based on the network flow criteria. Instructions 412 may be executed by the processor 402 to determine whether an upgrade is about to happen to a software residing in one or more of the plurality of APPVMs and/or containers. Instructions 414 may be executed by the processor 402 to determine one or more of the plurality of APPVMs and/or containers affected by the software upgrade based on the determined dependency relationships. Instructions 416 may be executed by the processor 402 to obtain snapshots of the affected one or more of the plurality of APPVMs and/or containers before initiating the software upgrade.

For simplicity of explanation, the example methods of FIGS. 3 and 4 are shown as executing serially, however it is to be understood and appreciated that the present and other examples are not limited by the illustrated order. The example systems of FIGS. 1 and 2, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

In some embodiments, a method may be performed by a processing resource executing instructions. The method may include obtaining training data for a software defined datacenter, wherein the training data comprises a plurality of training metrics associated with an application and respective response time data associated with the application, extracting a set of relevant metrics from the training data, determining a relationship between the relevant metrics and the respective response time data associated with the application, and predicting future performance of the application based on the relationship between the relevant features of the training data and the respective response time data associated with the application.

Although specific embodiments have been described above, these embodiments are not intended to limit the scope of the present disclosure, even where only a single embodiment is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing detailed description, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to:
periodically obtain network flow data between a plurality of application virtual machines (APPVMs) and/or containers in a virtual datacenter;
periodically obtain deep packet inspection information from firewalls associated with the periodically obtained network flow data in the virtual datacenter;
determine dependency relationships between the plurality of APPVMs and/or containers based on the periodically obtained network flow data, the periodically obtained deep packet inspection information, and a network flow criteria;
determine whether an upgrade is going to happen to a software residing in one or more of the plurality of APPVMs and/or containers;
determine one or more of the plurality of APPVMs and/or containers affected by the software upgrade based on the determined dependency relationships;
obtain snapshots of the affected one or more of the plurality of APPVMs and/or containers; and
initiate the software upgrade upon obtaining the snapshots of the affected one or more of the plurality of APPVMs and/or containers.

2. The non-transitory machine-readable medium of claim 1, wherein the deep packet inspection information comprises response time between network and application, purpose of communication request, application traffic volume details, and/or user conversation details.

3. The non-transitory machine-readable medium of claim 2, wherein the purpose of communication request is selected from a group consisting of database request, storage area network (SAN) request, and hypertext transfer protocol (HTTP) request.

4. The non-transitory machine-readable medium of claim 1, wherein the network flow criteria are selected from a group consisting of volume of network flow between the plurality of APPVMs and/or containers, frequency of the network flow between the plurality of APPVMs and/or containers, duration of the network flow between the plurality of APPVMs and/or containers, and nature of the network flow between the plurality of APPVMs and/or containers.

5. The non-transitory machine-readable medium of claim 1, wherein periodically obtaining the network flow data and the deep packet inspection information comprises:
periodically obtaining the network flow data and the deep packet inspection information within a software defined network (SDN) platform and a virtualization infrastructure layer.

6. The non-transitory machine-readable medium of claim 1, wherein determining the dependency relationships between the plurality of APPVMs and/or containers comprises:
creating one or more topology graphs between the software residing in the one or more of the plurality of APPVMs and/or containers based on the network flow criteria.

7. The non-transitory machine-readable medium of claim 6, wherein determining the one or more of the plurality of APPVMs and/or containers that are affected by the software upgrade based on the determined dependency relationships comprises:
determine one or more of the plurality of APPVMs and/or containers that are affected by the software upgrade based on the created one or more topology graphs.

8. The non-transitory machine-readable medium of claim 1, wherein the software is a distributed software application.

9. A method for resilient software upgrades in a virtual datacenter, the method comprising:
periodically obtaining network flow data between a plurality of application virtual machines (APPVMs) and/or containers in the virtual datacenter;
periodically obtaining deep packet inspection information from firewalls associated with the periodically obtained network flow data in the virtual datacenter;

determining dependency relationships between the plurality of APPVMs and/or containers based on the periodically obtained network flow data, the periodically obtained deep packet inspection information, and a network flow criteria;

determining whether an upgrade is going to happen to a software residing in one or more of the plurality of APPVMs and/or containers;

determining one or more of the plurality of APPVMs and/or containers affected by the software upgrade based on the determined dependency relationships;

obtaining snapshots of the affected one or more of the plurality of APPVMs and/or containers; and initiating the software upgrade upon obtaining the snapshots of the affected one or more of the plurality of APPVMs and/or containers.

10. The method of claim 9, wherein the deep packet inspection information comprises response time between network and application, purpose of communication request, application traffic volume details, and/or user conversation details.

11. The method of claim 9, wherein the network flow criteria are selected from a group consisting of volume of network flow between the plurality of APPVMs and/or containers, frequency of the network flow between the plurality of APPVMs and/or containers, duration of the network flow between the plurality of APPVMs and/or containers, and nature of the network flow between the plurality of APPVMs and/or containers.

12. The method of claim 9, wherein periodically obtaining the network flow data and the deep packet inspection information comprises:

periodically obtaining the network flow data and the deep packet inspection information within a software defined network (SDN) platform and a virtualization infrastructure layer.

13. The method of claim 9, wherein determining the dependency relationships between the plurality of APPVMs and/or containers comprises:

creating one or more topology graphs between the software residing in the one or more of the plurality of APPVMs and/or containers based on the network flow criteria.

14. The method of claim 13, wherein determining the one or more of the plurality of APPVMs and/or containers that are affected by the software upgrade based on the determined dependency relationships comprises:

determine one or more of the plurality of APPVMs and/or containers that are affected by the software upgrade based on the created one or more topology graphs.

15. A system comprising:
a processor; and
a non-transitory machine-readable medium storing instructions for controlling the processor to be operable to:

periodically obtain network flow data between a plurality of application virtual machines (APPVMs) and/or containers in a virtual datacenter;

periodically obtain deep packet inspection information from firewalls associated with the periodically obtained network flow data in the virtual datacenter;

determine dependency relationships between the plurality of APPVMs and/or containers based on the periodically obtained network flow data, the periodically obtained deep packet inspection information, and a network flow criteria;

determine whether an upgrade is going to happen to a software residing in one or more of the plurality of APPVMs and/or containers;

determine one or more of the plurality of APPVMs and/or containers affected by the software upgrade based on the determined dependency relationships;

obtain snapshots of the affected one or more of the plurality of APPVMs and/or containers; and initiate the software upgrade upon obtaining the snapshots of the affected one or more of the plurality of APPVMs and/or containers.

16. The system of claim 15, wherein the deep packet inspection information comprises response time between network and application, purpose of communication request, application traffic volume details, and/or user conversation details.

17. The system of claim 16, wherein the network flow criteria are selected from a group consisting of volume of network flow between the plurality of APPVMs and/or containers, frequency of the network flow between the plurality of APPVMs and/or containers, duration of the network flow between the plurality of APPVMs and/or containers, and nature of the network flow between the plurality of APPVMs and/or containers.

18. The system of claim 15, wherein periodically obtaining the network flow data and the deep packet inspection information comprises:

periodically obtaining the network flow data and the deep packet inspection information within a software defined network (SDN) platform and a virtualization infrastructure layer.

19. The system of claim 15, wherein determining the dependency relationships between the plurality of APPVMs and/or containers comprises:

creating one or more topology graphs between the software residing in the one or more of the plurality of APPVMs and/or containers based on the network flow criteria.

20. The system of claim 19, wherein determining the one or more of the plurality of APPVMs and/or containers that are affected by the software upgrade based on the determined dependency relationships comprises:

determine one or more of the plurality of APPVMs and/or containers that are affected by the software upgrade based on the created one or more topology graphs.

* * * * *